(12) United States Patent
Ho et al.

(10) Patent No.: US 7,447,394 B2
(45) Date of Patent: Nov. 4, 2008

(54) STABLE CENTER WAVELENGTH PERFORMANCE IN NON-RECTILINEARLY SHAPED OPTICAL INTEGRATED CIRCUIT CHIP

(75) Inventors: Calvin Ho, San Jose, CA (US); Brian McGinnis, Livermore, CA (US); Wilson Long, San Jose, CA (US); Ed Fontecha, San Jose, CA (US); David J. Quirke, San Jose, CA (US); Thomas S. Tarter, San Jose, CA (US); Sam Seto, Cupertino, CA (US); Liang Zhao, Sunnyvale, CA (US)

(73) Assignee: Neophotonics Corporation, San Jose, CA (US)

( * ) Notice: Subject to any disclaimer, the term of this patent is extended or adjusted under 35 U.S.C. 154(b) by 0 days.

(21) Appl. No.: 11/753,074

(22) Filed: May 24, 2007

(65) Prior Publication Data
US 2008/0080806 A1    Apr. 3, 2008

Related U.S. Application Data

(60) Provisional application No. 60/827,573, filed on Sep. 29, 2006.

(51) Int. Cl.
*G02B 6/12* (2006.01)
*G02B 6/28* (2006.01)
*G02B 6/34* (2006.01)

(52) U.S. Cl. .............................. 385/14; 385/24; 385/37

(58) Field of Classification Search ................. 385/14, 385/15, 24, 27, 31, 37, 39
See application file for complete search history.

(56) References Cited

U.S. PATENT DOCUMENTS

| 6,738,545 | B1 * | 5/2004 | Purchase et al. | 385/37 |
| 6,954,566 | B2 * | 10/2005 | Johannessen | 385/37 |
| 6,975,793 | B2 * | 12/2005 | Cole et al. | 385/33 |
| 7,062,127 | B2 * | 6/2006 | Purchase et al. | 385/37 |

* cited by examiner

*Primary Examiner*—Sung H Pak
*Assistant Examiner*—Daniel Petkovsek
(74) *Attorney, Agent, or Firm*—Amin, Turocy & Calvin, LLP

(57) ABSTRACT

An optical device with a non-rectilinearly shaped optical integrated circuit over a substantially flat portion of a riser, the riser also equipped with a relief structure that is in thermal contact with a stabilizing brace that is in turn connected to two portions of the non-rectilinearly shaped optical integrated circuit. The non-rectilinearly shaped optical integrated circuit exhibits reduced center wavelength drift.

20 Claims, 5 Drawing Sheets

STABLE CENTER WAVELENGTH PERFORMANCE IN NON-RECTILINEARLY SHAPED OPTICAL INTEGRATED CIRCUIT CHIP

CROSS REFERENCE TO RELATED APPLICATIONS

The subject invention claims the benefit of priority from co-pending provisional application Ser. No. 60/827,573 filed Sep. 29, 2006, which is hereby incorporated by reference.

TECHNICAL FIELD

The subject invention generally relates to optical devices and methods with non-rectilinearly shaped optical integrated circuits with minimal center wavelength shift over a range of temperatures.

BACKGROUND

As optical networks support communications including burgeoning Internet traffic, the need for advanced and efficient optical components rises. Optical communication systems permit the transmission of large quantities of information. Improved optical integrated circuits (OICs) are particularly needed. OICs come in many forms such as 1×N optical splitters, optical switches, wavelength division multiplexers (WDMs), demultiplexers, optical add/drop multiplexers (OADMs), and the like. Optical circuits allow branching, coupling, switching, separating, multiplexing and demultiplexing of optical signals without intermediate transformation between optical and electrical media.

Such optical circuits include planar lightwave circuits (PLCs) having optical waveguides on flat rectangular substrates, which can be used for routing optical signals from one of a number of input optical fibers to any one of a number of output optical fibers or optical circuitry. PLCs make it possible to achieve higher densities, greater production volume and more diverse functions than are available with fiber components through employment of manufacturing techniques typically associated with the semiconductor industry. For instance, PLCs contain optical paths known as waveguides formed on a silicon wafer substrate, wherein the waveguides are made from transmissive media which have a higher refractive index than the chip substrate or the outlying cladding layers in order to guide light along the optical path. PLCs are fashioned to integrate multiple components and functionalities into a single optical chip.

One important application of PLCs specifically and OICs generally involves wavelength-division multiplexing (WDM) including dense wavelength-division multiplexing (DWDM). DWDM allows optical signals of different wavelengths, each carrying separate information, to be transmitted via a single optical channel or fiber in an optical network. In order to provide advanced multiplexing and demultiplexing (e.g., DWDM) and other functions in such networks, arrayed-waveguide gratings (AWGs) are available in the form of PLCs. These applications, especially AWG's, however, are extremely sensitive to temperature variations and stress including thermal stress. Consequently, devices used in these applications often suffer from thermal stress induced birefringence and resultant polarization dependent wavelength shift

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The subject invention provides optical devices and methods with non-rectilinearly shaped OICs with minimal center wavelength sift over a range of temperatures. The minimal center wavelength shift is largely attributable to at least one of two design aspects. First, a stabilizing brace is affixed and positioned to the OIC to prevent and/or mitigate temperature induced motion across the OIC. Second, a relief structure in the riser provides thermal contact between the riser and a stabilizing brace in addition to contact between an OIC and other portions of the riser. The invention thus provides for mitigation of temperature sensitivity of non-rectilinearly shaped OICs by employing a stabilizing brace and/or a relief structure in the riser.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

It has been found that non-rectilinearly shaped OICs exhibit undesirably large center wavelength shift in response to stress such as temperature changes. Due to the geometry of non-rectilinearly shaped OICs, slight deformations are more likely than deformations in square/rectangular shaped OICs in response to the same stimuli. Such stress or stimuli include changes in temperature (and consequent expansion/contraction), tension on optical fibers coupled to the optical device (otherwise known as fiber pull), impact (due to dropping the optical device or another object impacting the optical device), and the like.

The non-rectilinearly shaped OICs of the invention contain at least one of two features that reduces, minimizes, and/or eliminates center wavelength shift over a range of temperatures (especially compared to OICs without one or two of the below described features). The first of the two features is a stabilizing brace that is affixed to the non-rectilinearly shaped OIC and positioned to prevent and/or mitigate temperature induced motion across the non-rectilinearly shaped OIC. The second of the two features is a relief structure in the riser that enables thermal contact between the relief structure of the riser and the stabilizing brace.

Figure 1:
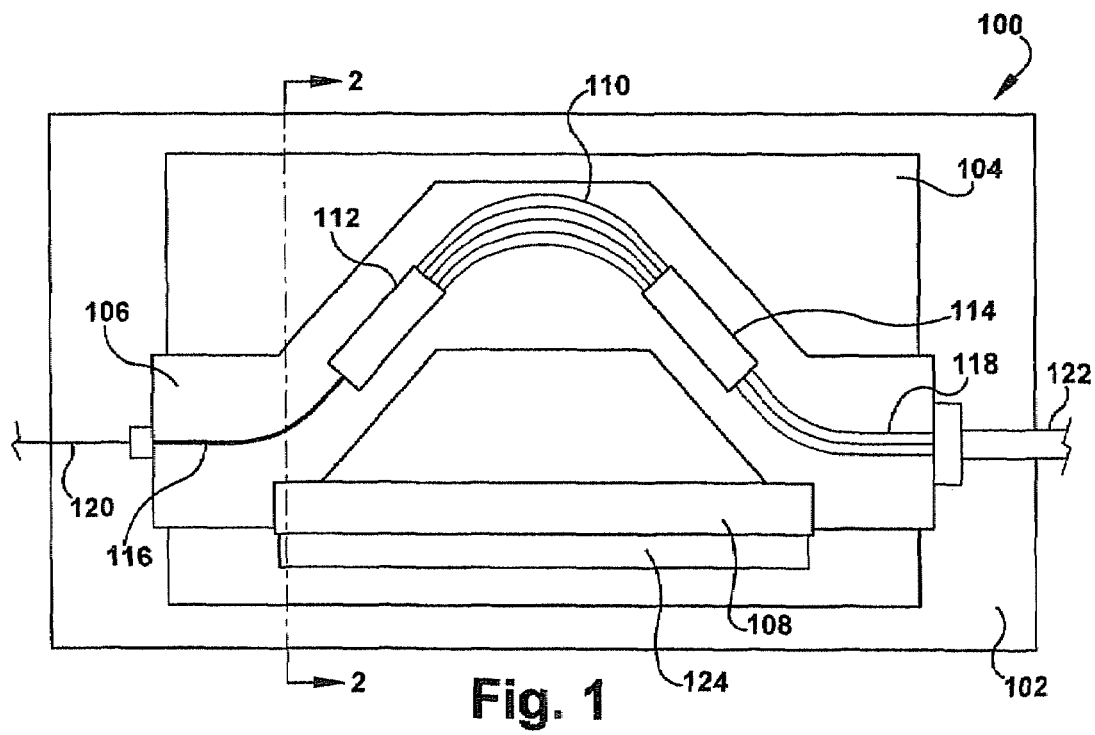
FIG. 1 illustrates a top down view of an optical device in accordance with an aspect of the subject invention.

Referring to FIG. 1, a top down view of an optical device 100 in accordance with an aspect of the subject invention is shown. The optical device 100 contains base 102 that in turn contains a riser 104. The riser 104 may be a large relief structure in the base 102 or a separate platform affixed to the base 102. A non-rectilinearly shaped OIC 106 is positioned over the riser 104. Although shown as rectangular, the riser 104 can have any shape, so long as it supports the non-rectilinearly shaped OIC 106. The non-rectilinearly shaped OIC 106 can be bonded with a suitable adhesive or tape to the riser 104. The non-rectilinearly shaped OIC 106 is suitably positioned to permit thermal contact between the riser 104 and the non-rectilinearly shaped OIC 106. A stabilizing brace 108 extends from a first portion of the OIC 106 to a second portion of the OIC 106 through free space. The stabilizing brace 108 can be attached in any suitable manner to the OIC 106, such as bonded with a cured adhesive.

The non-rectilinearly shaped OIC 106 contains optical components and in this example it contains an arrayed waveguide grating 110 positioned between two lenses 112 and 114, one or more input waveguide(s) 116 extending from one end of the OIC to the first lens 112, and one or more output waveguides 118 extending from the second lens 114 to another end of the OIC. The optical device 100 may contain an optical input 120 such as one or more optical fibers and an optical output 122 such as one or more optical fibers.

The riser 104 contains a relief structure 124 suitably positioned to permit thermal contact between the relief structure 124 and the stabilizing brace 108. The relief structure 124 permits different portions of the riser 104 to be in thermal contact with the non-rectilinearly shaped OIC 106 and the stabilizing brace 108.

Although not shown, the optical device 100 can contain an apparatus for controlling the temperature of at least one of the riser 104, the non-rectilinearly shaped optical integrated circuit 106, and the stabilizing brace 108. The apparatus may also control the temperature of other portions of the base 102 and/or optical device 100. Temperature control can be implemented in any suitable manner, such as by one or more of a heater, a cooler, a heat conductor, and an insulator. Sensing, control, and programming mechanisms may be associated with the apparatus for temperature control.

Figure 2:
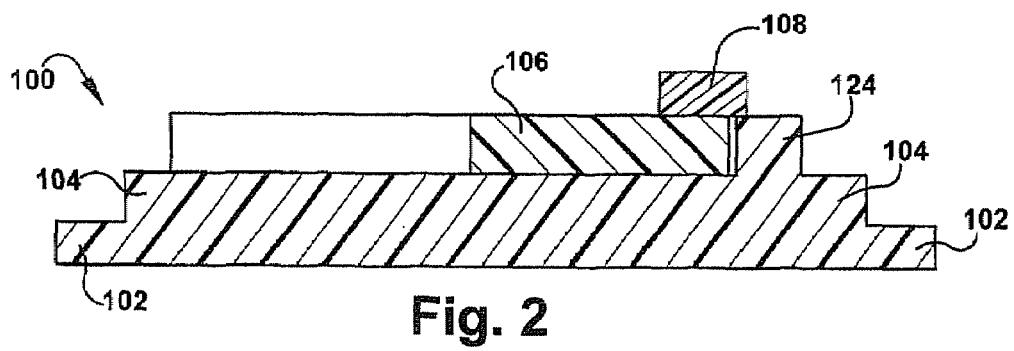
FIG. 2 illustrates a cross-sectional view of an optical device in accordance with an aspect of the subject invention.

Referring to FIG. 2, which is a cross-sectional view of the optical device 100 of FIG. 1 along the dashed line in the direction of arrows 2, an additional perspective on the optical device 100 arrangement described in FIG. 1 can be obtained. Base 102 contains a riser 104, which in this example is shown as part of the base 102, but the riser 104 can alternatively be a separate structure. The riser 104 contains a substantially flat portion and a relief structure 124, which is in thermal contact with the stabilizing brace 108. The substantially flat portion of the riser 104 is in thermal contact with the non-rectilinearly shaped OIC 106. In either or both instances of contact between the relief structure 124 and the stabilizing brace 108 and contact between the riser 104 and the non-rectilinearly shaped OIC 106, contact may be direct, or an adhesive or bonding structure may be present to hold each item in a substantially fixed position relative the other.

Both the stabilizing brace 108 (connected/bridging a first portion and a second portion of the OIC) and the relief structure 124 (permitting stable contact between the riser and both the non-rectilinearly shaped OIC 106 and the stabilizing brace 108) contribute to reducing, minimizing, and/or eliminating center wavelength shift as the temperature changes. When the stabilizing brace 108 and the non-rectilinearly shaped OIC substrate are made of materials with the same or similar coefficients of thermal expansion, the contribution of the stabilizing brace 108 and the relief structure 124 to reducing, minimizing, and/or eliminating center wavelength shift as the temperature changes is even greater. When the riser is in thermal contact with both the non-rectilinearly shaped OIC 106 and the stabilizing brace 108, improved heat spreading/heat sinking is achieved (compared to situations where the riser is only in contact with an OIC), thereby promoting a more uniform temperature throughout components of the optical device 100.

Non-rectilinearly shaped OICs do not have a rectangular shape nor a square shape. It is noted that most conventional OICs have a rectangular or a square shape. That is, the substrates of conventional OICs have a rectangular or a square shape. The non-rectilinearly shaped OICs may have straight and/or curvilinear edges. The substrates of non-rectilinearly shaped OICs are typically substantially planar. The non-rectilinearly shaped OICs minimize the unused surface area of the OIC substrate, and thus have a surface area notably smaller than the surface area of a rectangle shaped OIC substrate (for supporting the same optical components). In this connection, the shape of the non-rectilinearly shaped OICs more closely mimics the shape or pattern of the optical components formed on the OIC compared to a rectangular shaped OIC. The smaller surface area of the non-rectilinearly shaped OIC substrate, compared to rectangle shaped OIC substrates, permits more compact designs for devices containing non-rectilinearly shaped OICs.

The non-rectilinearly shaped OIC substrates are made with or contain at least one of silica, amorphous silicon, monocrystalline silicon, polysilicon, silicon oxynitride, silicate glasses such as tetraethylorthosilicate, organic/polymeric materials, other semiconductor device substrates such as InP, GaAs, and the like, and the like. Other silicate glasses include phosphosilicate glass, fluorosilicate glass, borosilicate glass, borophosphosilicate glass, and borophosphotetraethylorthosilicate. A specific example of borosilicate glass is Borofloat® glass available from SCHOTT North America, Inc.

The non-rectilinearly shaped OICs support various optical components. For example, the non-rectilinearly shaped OICs support one or more of lenses, taps, optical ports, waveguides, multiplexers, demultiplexers, arrayed waveguide gratings (AWGs), optical splitters, optical routers, Mach-Zehnder devices including Mach-Zehnder interferometers, variable optical attenuators, and the like. In one embodiment, the OIC is a planar lightwave circuit (PLC).

Figure 3:
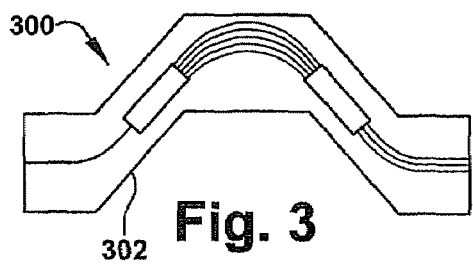
FIG. 3 illustrates a top down view of a non-rectilinearly shaped OIC in accordance with an aspect of the subject invention.

Referring to FIG. 3, an exemplary non-rectilinearly shaped OIC 300 is shown. The non-rectilinearly shaped OIC substrate 302 has straight edges, but is not in the shape of a rectangle or square.

Figure 4:
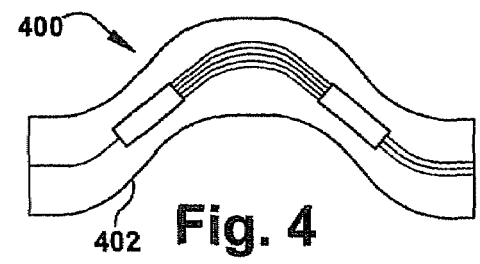
FIG. 4 illustrates a top down view of another non-rectilinearly shaped OIC in accordance with an aspect of the subject invention.

Referring to FIG. 4, another exemplary non-rectilinearly shaped OIC 400 is shown. The non-rectilinearly shaped OIC substrate 402 has curvilinear and straight edges.

Figure 5:
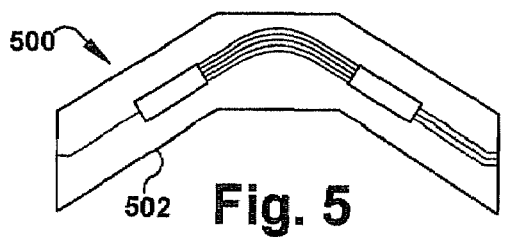
FIG. 5 illustrates a top down view of yet another non-rectilinearly shaped OIC in accordance with an aspect of the subject invention.

Referring to FIG. 5, yet another exemplary non-rectilinearly shaped OIC 500 is shown. The non-rectilinearly shaped OIC has a substrate 502 with straight edges, but is not in the shape of a rectangle or square.

Each of the non-rectilinearly shaped OIC in FIGS. 3 to 5 has a first portion which is separated from a second portion by free space. For example, as shown in each of FIGS. 3 to 5, the portion of the OIC containing the input waveguide (located on the left side, extending from the left edge to a first lens) is separated horizontally by free space from the portion of the OIC containing the three output waveguides (located on the right side extending from a second lens to the right edge). Alternatively or additionally, the first and second lenses may be in first and second portions of an OIC, respectively, that are separated by free space. In fact, any two optical components may be in first and second portions of an OIC, respectively, that are separated by free space. In this context, a non-rectilinearly shaped OIC has at least two portions that are separated by free space.

Figure 6:
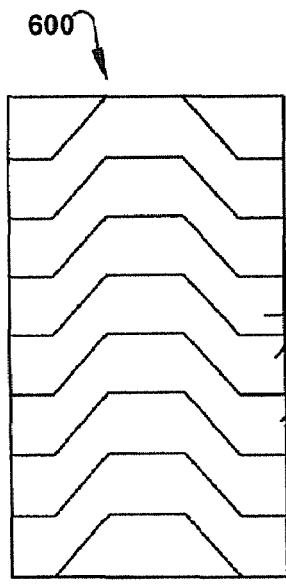
FIG. 6 illustrates a top down view of a master substrate with non-rectilinearly shaped OICs in accordance with an aspect of the subject invention.

Referring to FIG. 6, a substrate master 600 with a plurality of non-rectilinearly shaped OIC substrates 602 is shown. The substrate master 600 contains non-rectilinearly shaped OIC substrates 602 that have straight edges.

Figure 7:
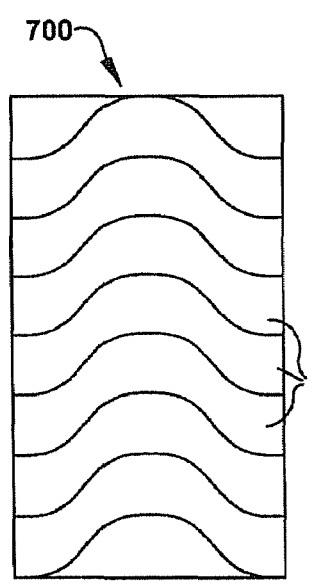
FIG. 7 illustrates a top down view of another master substrate with non-rectilinearly shaped OICs in accordance with an aspect of the subject invention.

Referring to FIG. 7, another substrate master 700 with a plurality of non-rectilinearly shaped OIC substrates 702 is shown. The substrate master 700 contains non-rectilinearly shaped OIC substrates 702 that have curvilinear and straight edges.

Figure 8:
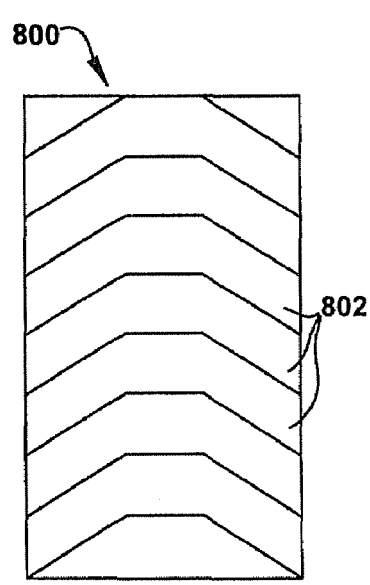
FIG. 8 illustrates a top down view of yet another master substrate with non-rectilinearly shaped OICs in accordance with an aspect of the subject invention.

Referring to FIG. 8, yet another substrate master 800 with a plurality of non-rectilinearly shaped OIC substrates 802 is shown. The substrate master 800 contains non-rectilinearly shaped OIC substrates 802 that have straight edges.

Although only seven OIC substrates are shown in FIG. 6, FIG. 7, and FIG. 8, typically a master substrate is fabricated with about 2 to about 50 non-rectilinearly shaped OIC substrates nested therein.

When the shape of the plurality of non-rectilinearly shaped OIC substrates in a given master substrate is regular or consistent (substantially the same), they may be nested on the substrate master to maximize the number of OIC substrates fabricated from a given master substrate. In order to maximize yield, curvilinear dicing or non-rectilinearly dicing is employed. Curvilinear dicing or non-rectilinearly dicing significantly improves wafer yields of non-rectilinearly shaped OICs by allowing all nested optical component designs on a wafer to be diced out without loss to neighboring or adjacent non-rectilinearly shaped OICs. In other words, prior to curvilinear dicing or non-rectilinearly dicing a master substrate, optical component designs may be fabricated on the master substrate more closely compared to situations where optical component designs are fabricated on a master substrate subsequently subjected to straight dicing to form rectangular shaped OICs.

Since the pattern of the optical component designs formed on/in the OIC substrates are often non-rectilinearly shaped, when the curvilinear dicing or non-rectilinearly dicing more closely follows the pattern of the optical component designs, the resultant shape is a non-rectilinear shape. This allows for a greater number of non-rectilinearly shaped OICs produced from a master substrate than rectangular shaped OICs from the same size master substrate.

Optionally, stop cracks may be formed in a non-rectilinearly shaped OIC substrate to facilitate curvilinear cutting or non-rectilinearly cutting of the OICs from a master substrate while minimizing/controlling potential chipping and cracking of the OIC and master substrate. The optional stop crack is made in any suitable manner. For example, the crack may be formed using a saw including dicing saws and wire saws, a milling machine, a laser, a water jet, or chemical etching. The stop cracks are made on the OICs at any time prior to dicing from the master substrate. In this connection, the stop cracks may be formed before, during or after optical components are provided in/on the substrate. The stop crack may remain empty after formation, or a material may be formed within the crack, such as providing silicon dioxide or other dielectric material in the crack. The stop crack may thus be a trench or a layer of a stop crack material.

The width and depth of the optional stop crack is effective to deflect or prevent cracks and/or chips due to curvilinear or non-rectilinearly cutting from propagating into the active region of the OIC. In one embodiment, the width of the stop crack is about 1 micron or more and about 1 mm or less. In another embodiment, the depth of the stop crack is at least about 5% of the thickness of the OIC. Preferably, the stop cracks of adjacent nested OICs are substantially parallel and the cut edge or incision is substantially parallel with the stop cracks.

The presence of the optional stop cracks in some instances reduces the propensity of cracks and chips caused during dicing from degrading the active region of the OIC. In other words, cracks and chips created by curvilinear and non-rectilinearly dicing do not spread out of sacrificial regions (located between the edges and the stop cracks) into the active region of the OIC because the stop cracks contain and/or isolate the cutting induced defects to the sacrificial regions. Further description of stop cracks exists in U.S. Pat. No. 6,895,133, which is hereby incorporated by reference.

The non-rectilinearly shaped OIC substrate (or non-rectilinearly shaped OIC when the optical components are formed on the master substrate) is diced from the master substrate in a curvilinear and/or rectilinear manner using any suitable cutting technique. For example, the substrate may be diced using one or more of a saw, a milling machine, a laser, or a water jet.

The stabilizing brace extends from a first portion of the non-rectilinearly shaped OIC to a second portion through free space. At least a portion of the stabilizing brace is in a different plane from the OIC. However, the stabilizing brace is in an at least substantially parallel plane with the OIC. Since at least a portion of the stabilizing brace is in a different plane from the OIC, the riser contains a relief structure so that the riser is in contact with or adjacent the OIC and stabilizing brace. That is, a first portion of the riser is in contact with or adjacent the OIC while a second portion of the riser is in contact with or adjacent the stabilizing brace.

The stabilizing brace is attached to the non-rectilinearly shaped OIC in any suitable manner to mitigate center wavelength drift. Examples of attachment include using an adhesive such as a thermally conductive adhesive, using a grease such as a thermally conductive grease, and fusing the surfaces using heat and/or irradiation.

The stabilizing brace contains any material suitable to mitigate center wavelength drift in a non-rectilinearly shaped OIC to which it is attached. Examples of stabilizing brace materials include at least one of silica, amorphous silicon, monocrystalline silicon, polysilicon, silicon oxynitride, silicate glasses such as tetraethylorthosilicate, organic/polymeric materials, other semiconductor device substrate materials such as InP, GaAs, and the like, and the like. Other silicate glasses include phosphosilicate glass, fluorosilicate glass, borosilicate glass, borophosphosilicate glass, and borophosphotetraethylorthosilicate.

In one embodiment, the stabilizing brace and the non-rectilinearly shaped OIC substrate are made of the same material. In another embodiment, the stabilizing brace and the non-rectilinearly shaped OIC substrate are made of materials that have coefficients of thermal expansion within about 25% of each other (the difference in the coefficient of thermal expansion of the stabilizing brace and the non-rectilinearly shaped OIC substrate is within 25% of the value of the coefficient of thermal expansion of the stabilizing brace or the non-rectilinearly shaped OIC substrate). In yet another embodiment, the stabilizing brace and the non-rectilinearly shaped OIC substrate are made of materials that have coefficients of thermal expansion within about 10% of each other. In still yet another embodiment, the stabilizing brace and the non-rectilinearly shaped OIC substrate are made of materials that have coefficients of thermal expansion within about 5% of each other.

In one embodiment, the stabilizing brace is a thermal actuator. Further description of thermal actuators exists in U.S. Pat. No. 6,975,793, which is hereby incorporated by reference.

The non-rectilinearly shaped OIC is mounted over the riser of a base. While the base typically has the riser as a relatively large relief structure within the base, the base may be a separate structure with a riser mounted thereon. Since the configuration of the base is not critical to the invention, whether the base contains or is separate from the riser is not important. The base/riser is made of a material having a coefficient of thermal expansion coefficient different from the non-rectilinearly shaped OIC substrate. The base/riser can be made of a metal, metal alloy, or hard plastic material. Examples of metals and metal alloys include one or more of aluminum, brass, bronze, chromium, copper, gold, iron, magnesium, nickel, palladium, platinum, silver, stainless steel, tin, titanium, tungsten, zinc, zirconium, Hastelloy®, Kovar®, Invar, Monel®, Inconel®, and the like. Examples of plastic materials include polycarbonate, polyesters, polyolefins such as polyethylene and polypropylene, and the like.

The riser is typically substantially flat and in thermal contact with the non-rectilinearly shaped OIC, except for the relief structure that is in thermal contact with the stabilizing brace or not in contact with the stabilizing brace. Generally, the portion of the riser that is not the relief structure is in thermal contact with the non-rectilinearly shaped OIC. The riser may any shape, and examples include a circle, oval, square, rectangle, polygon, hexagon, pentagon, octagon, rhomboid, triangle, and the like.

The riser contains a relief structure that is in thermal contact with the stabilizing brace. Other portions of the riser (that are not the relief structure) are not in contact with the stabilizing brace. The relief structure has any shape suitable to thermally and/or physically contact the stabilizing brace. For example, the relief structure may be a rectangular step, oval step, polygonal step, and the like. The relief structure enables a portion of the riser to be in contact with the stabilizing brace, which has a surface that is at least partially in a different horizontal plane as a surface of the non-rectilinearly shaped OIC.

The riser is attached to the non-rectilinearly shaped OIC and the stabilizing brace in any suitable manner to mitigate center wavelength drift. Examples of attachment include using a an adhesive such as a thermally conductive adhesive, using a grease such as a thermally conductive grease, and fusing the surfaces using heat and/or irradiation.

The riser can function as at least one of a heat spreader (to both the non-rectilinearly shaped OIC and the stabilizing brace) promoting a uniform temperature throughout the OIC device, a heat sink (to both the non-rectilinearly shaped OIC and the stabilizing brace) promoting a uniform temperature throughout the OIC device, and a physical stabilizer (to both the non-rectilinearly shaped OIC and the stabilizing brace) preventing/mitigating undesired torsional, rotational, compressive, expansive and impact forces.

Figure 9:
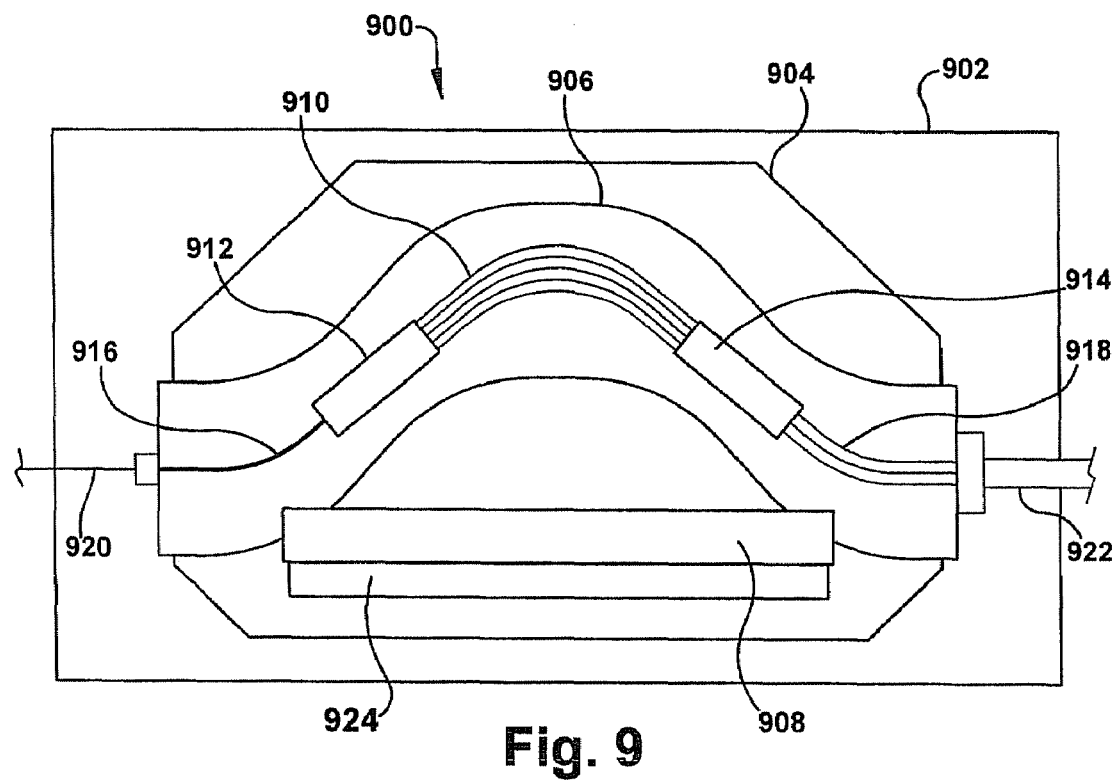
FIG. 9 illustrates a top down view of another optical device in accordance with an aspect of the subject invention.

Referring to FIG. 9, another top down view of an optical device 900 in accordance with an aspect of the subject invention is shown. The optical device 900 contains base 902 that in turn contains a riser 904. The riser 904 may be a large relief structure in the base 902 or a separate platform affixed to the base 902. A non-rectilinearly shaped OIC 906 is positioned over the riser 904. The non-rectilinearly shaped OIC 906 can be bonded with a suitable adhesive, grease, or tape to the riser 904. The non-rectilinearly shaped OIC 906 is suitably positioned to permit thermal contact between the riser 904 and the non-rectilinearly shaped OIC 906. A stabilizing brace 908 extends from a first portion of the OIC 906 to a second portion of the OIC 906 through free space. The stabilizing brace 908 can be attached in any suitable manner to the OIC 906, such as bonded with a cured adhesive.

The non-rectilinearly shaped OIC 906 contains optical components and in this example it contains an arrayed waveguide grating 910 positioned between two lenses 912 and 914, one or more input waveguide(s) 916 extending from one end of the OIC to the first lens 912, and one or more output waveguides 918 extending from the second lens 914 to another end of the OIC. The optical device 900 may contain an optical input 920 such as one or more optical fibers and an optical output 922 such as one or more optical fibers.

The riser 904 contains a relief structure 924 suitably positioned to permit thermal contact between the relief structure 924 and the stabilizing brace 908. The relief structure 924 permits different portions of the riser 904 to be in thermal contact with the non-rectilinearly shaped OIC 906 and the stabilizing brace 908. Portions other than the relief structure 924 of the riser 904 are in thermal contact with the non-rectilinearly shaped OIC 906. In either or both instances of contact between the relief structure 924 and the stabilizing brace 908 and contact between the other portions of the riser 904 and the non-rectilinearly shaped OIC 906, contact may be direct, or an adhesive, grease, or bonding structure may be present to hold each item in a substantially fixed position relative the other. Although shown as octagonal, the riser 904 can have any shape, so long as it supports the non-rectilinearly shaped OIC 906.

Both the stabilizing brace 908 (connected/bridging a first portion and a second portion of the OIC) and the relief structure 924 (permitting stable contact between the riser and both the non-rectilinearly shaped OIC 906 and the stabilizing brace 908) contribute to reducing, minimizing, and/or eliminating center wavelength shift as the temperature changes. When the stabilizing brace 908 and the non-rectilinearly shaped OIC substrate are made of materials with the same or similar coefficients of thermal expansion, the contribution of the stabilizing brace 908 and the relief structure 924 to reducing, minimizing, and/or eliminating center wavelength shift as the temperature changes is even greater. When the riser is in thermal contact with both the non-rectilinearly shaped OIC 106 and the stabilizing brace 908, improved heat spreading/heat sinking is achieved (compared to situations where the riser is only in contact with an OIC), thereby promoting a more uniform temperature throughout components of the optical device 900.

An apparatus such as a heater or heating system can be affixed to the base/riser, typically the side of the base/riser opposite that of the non-rectilinearly shaped OIC, to substantially uniformly spread heat from the riser to the non-rectilinearly shaped OIC and the stabilizing brace. The heater can be any OIC type heater suitable to contribute to uniform temperature spreading. Generally speaking, the heater can be an isothermal heater, a plurality of small heaters disposed about a plate attached to the riser, or a constant flux heater. A constant flux heater contains one or more heating elements typically centered on a metal plate attached to the riser. A heating system can include a heater and a temperature regulating system for regulating the temperature of the heater.

An isothermal heater mitigates/removes heating element traces from the center of the heater and pushes them out towards the corners of the heater. The heating elements can be idealized as a line source. The line heat source can be configured as an arc of a circle with the center of the arc placed closer to the center of the heater so that the temperature isotherms at the center of the heater become more uniform. Further description of isothermal heaters exists in U.S. patent application Ser. No. 10/744,790 filed on Dec. 23, 2003, which is hereby incorporated by reference.

Figure 10:
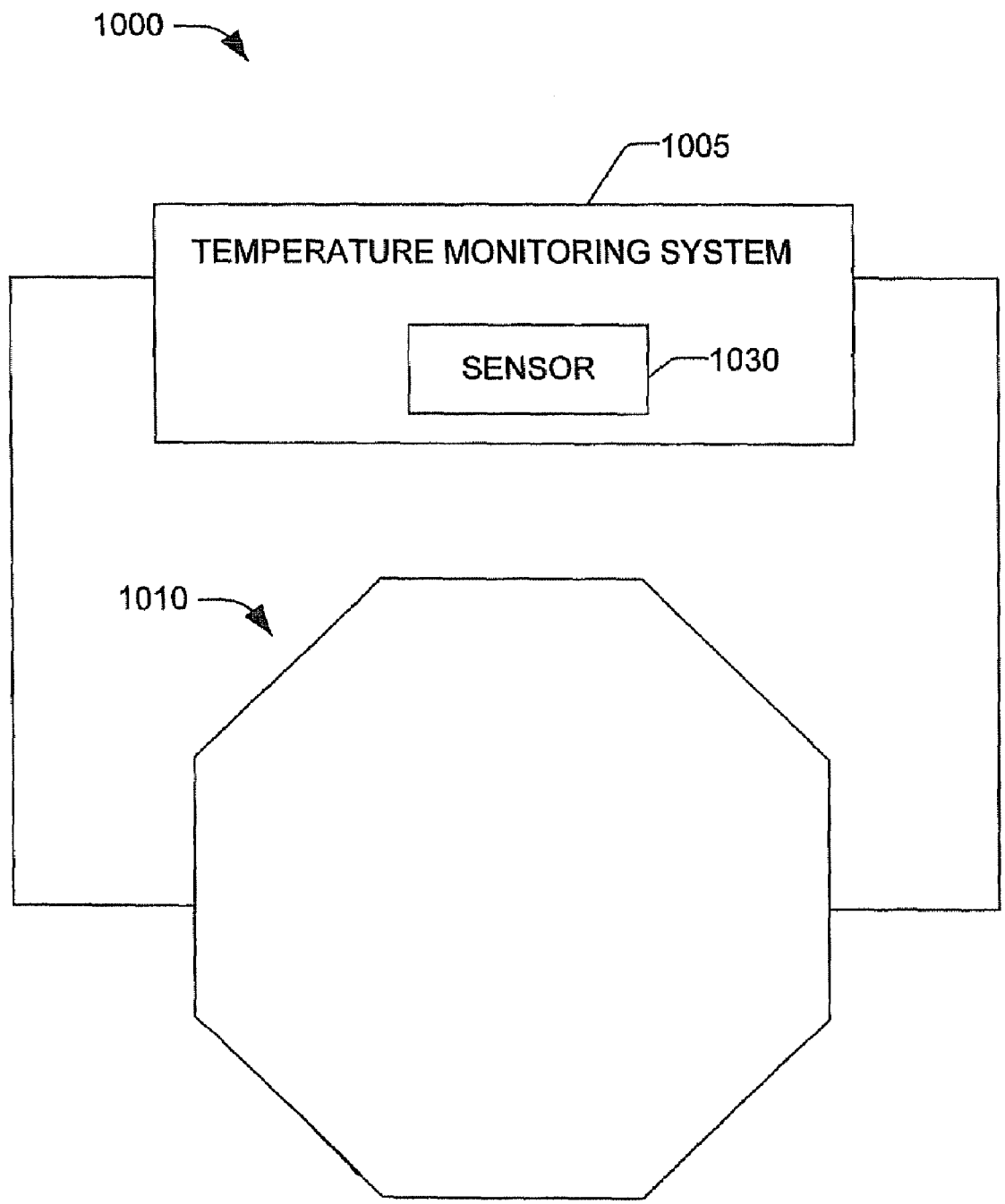
FIG. 10 shows a system for an optical device employing a heater in accordance with an aspect of the subject invention.

Referring to FIG. 10, a system 1000 for reducing temperature variations across a non-rectilinearly shaped OIC which includes a temperature monitoring system 1005 is illustrated. The temperature monitoring system 1005 is coupled to a heater 1010, such as an isothermal thin film heater. The heater 1010 comprises a heating element fitted for positioning under a riser, such as a conductive thermally conductive foil and/or a conductive plate (not shown) and/or at least one heating element trace. The temperature monitoring system 1005 provides temperature information during the above described process in order to facilitate uniform heating of an OIC. The temperature monitoring system 1005 can provide the temperature information of the heater 1010 and/or the non-rectilinearly shaped OIC. Accordingly, the temperature information can be employed to provide adjustment of the temperature of the heater 1010 and/or non-rectilinearly shaped OIC, if needed. Alternatively, the temperature monitoring system 1005 can provide temperature information of the heating elements. Thus, it is to be appreciated that the temperature monitoring system 1005 can provide temperature information of any suitable component of the system 1000. The temperature monitoring system 1005 includes a temperature sensor 1030 for determining a temperature of the non-rectilinearly shaped OIC and/or heater 1010. It is to be appreciated that the temperature sensor 1030 selected will depend on the particular material being heated, and the desired range of heating temperatures.

Figure 11:
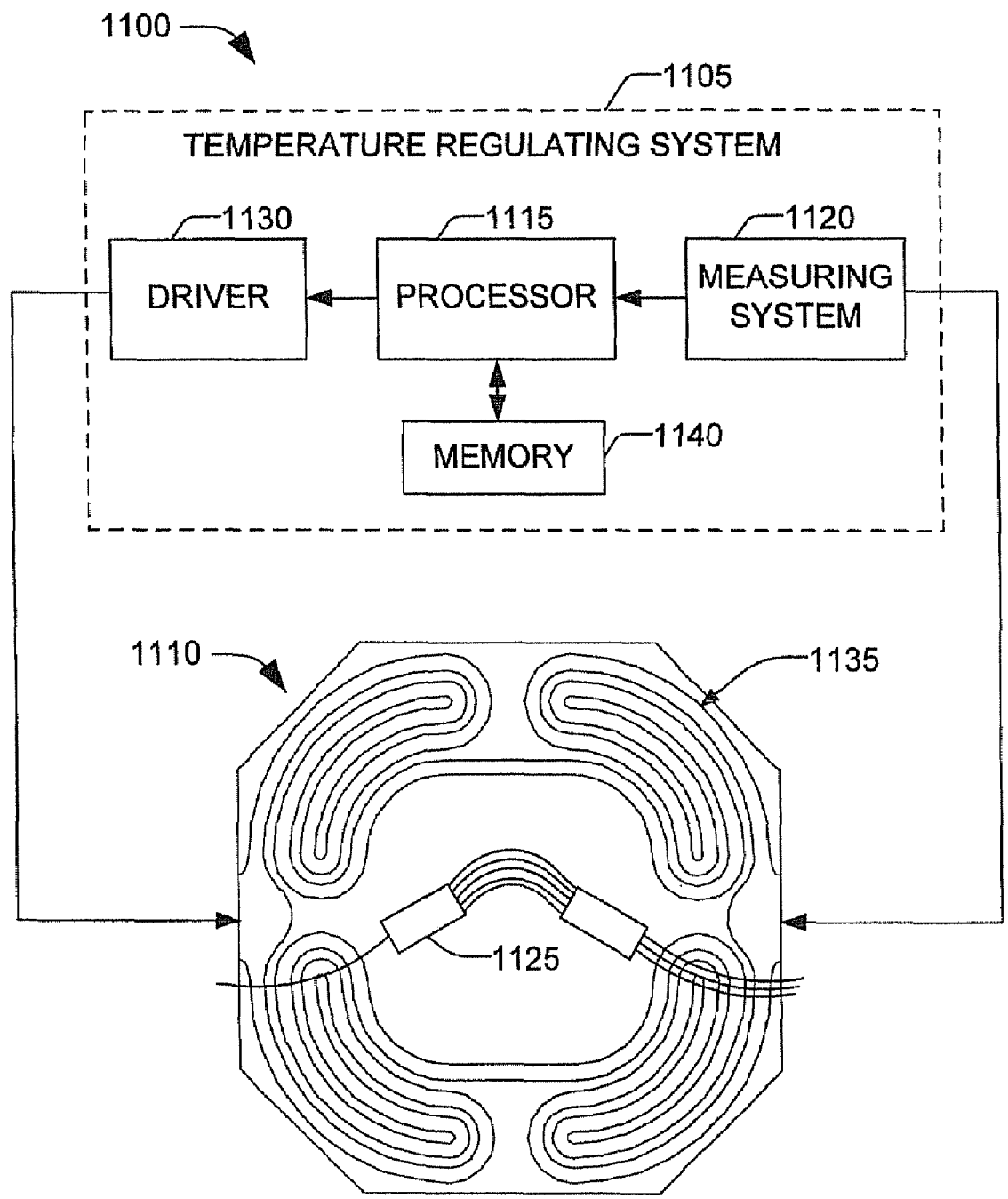
FIG. 11 shows another system an optical device employing an isothermal heater in accordance with an aspect of the subject invention.

Turning now to FIG. 11, another exemplary system 1100 employing an isothermal thin film heater is depicted. System 1100 includes a temperature regulating system 1105 for regulating a temperature of a thin film heater 1110. The temperature regulating system 1105 comprises a processor 1115 for receiving data from a temperature measuring system 1120 and determining a temperature of a non-rectilinearly shaped optical device, (e.g., an AWG) 1125 and/or the heater 1110. The processor 1115 is operatively coupled to the temperature regulating system 1105 and is programmed to control and operate the various components within the system 1100 in order to carry out the various functions described herein. The processor 1105 can be coupled to a heating element driver 1130, which drives heat element trace(s) 1135 coupled to the thin film heater 1110. The heating element driver 1130 can be controlled by the processor 1115 so as to selectively vary heat output of various heating element trace(s) 1135. The processor (or CPU) 1115 may be any of a plurality of suitable processors. The manner in which the processor 1115 can be programmed to carry out the functions relating to the present invention will be readily apparent to those having ordinary skill in the art based on the description provided herein.

A memory 1140, which is operatively coupled to the processor 1115, is also included in the system 1100 and serves to store program code executed by the processor 1115 for carrying out operating functions of the system 1100 as described herein. The memory 1140 includes read only memory (ROM) and random access memory (RAM). The ROM contains among other code the Basic Input-Output System (BIOS) which controls the basic hardware operations of the system 1100. The RAM is the main memory into which the operating system and application programs are loaded. The memory 1140 also serves as a storage medium for temporarily storing information such as AWG temperature, heater temperature, acceptable temperature tables, and other data which may be employed in carrying out the present invention. For mass data storage, the memory 1140 may include a hard disk drive (e.g., 10 Gigabyte hard drive). A power supply (not shown) can be utilized to provide operating power to the system 1100. Any suitable power supply (e.g., battery, line power) may be employed to carry out the present invention.

In one embodiment, the subject invention provides athermal non-rectilinearly shaped OICs by employing beam deflection, using a non-rectilinearly shaped OIC device having two or, more distinct regions that can move relative to one another. This relative movement causes shifts in the center wavelength, or wavelength of peak transmission for a given channel, of the non-rectilinearly shaped OIC that are proportional to the motion of the two pieces. The non-rectilinearly shaped OIC is designed such that the degree of center wavelength shift change caused by the motion of the two regions is equal in magnitude and opposite in sign to the center wavelength shift change inherent in the non-rectilinearly shaped OIC (as caused by expansion/contraction of the OIC and dependencies of waveguide refractive index upon temperature) then the device has approximately zero net dependence of center wavelength shift upon temperature, having a center wavelength that is substantially independent of temperature, and can be thus termed athermal.

As the temperature of a non-rectilinearly shaped OIC increases or decreases, the index of refraction of one or more region waveguide(s) may change. In order to compensate for this temperature based index of refraction change, the stabilizing brace expands/contracts as a result of the temperature change, causing the edges of the non-rectilinearly shaped OIC chip to move relative a middle portion (e.g., rotate). The movement (rotation) caused by temperature changes corresponds to or compensates for the temperature-change induced wavelength shifts in the waveguide(s) due to temperature dependant refractive index. As such, wavelength shift associated with waveguide temperature dependent refractive index change can be mitigated. Thus, loss of signal and/or cross talk in communication system(s) employing the non-rectilinearly shaped OIC can be reduced.

Figure 12:
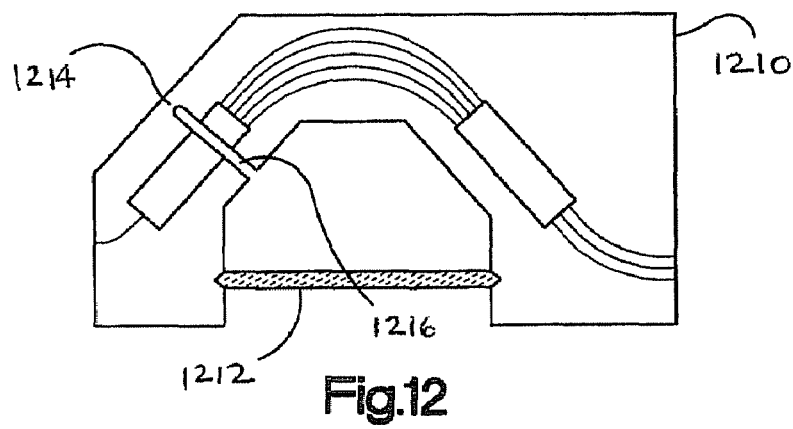
FIG. 12 is a schematic top plan view of a non-rectilinearly shaped OIC with a stabilizing brace in accordance with one aspect of the subject invention.

Referring to FIG. 12, a non-rectilinearly shaped OIC chip 110 is shown having a substrate, an input waveguide, a first lens, a second lens, a waveguide grating between the two lenses containing a plurality of waveguides, and output waveguides. A stabilizing brace 112 connects two regions of the chip, divided by a groove 116. The non-rectilinearly shaped OIC chip 110 contains a hinge 114.

The gap or groove 116 is formed in the non-rectilinearly shaped OIC chip 110 traversing an optical component, such as one or more of the lenses. The groove 116 goes all the way through the non-rectilinearly shaped OIC chip 110 vertically. The groove 116 is formed in any suitable manner including using a dicing saw, water jet cutting, chemical etching, laser-wafer-cutter, wire-saw, EDM, and the like. Although not shown, the groove 116 may traverse the waveguide grating instead of the lens, and the hinge 114 would be positioned visually above the waveguide grating.

Within the gap or groove 116, a waveplate (not shown), such as a half waveplate, may be optionally formed, particularly when the groove traverses the waveguide grating. Additionally or alternatively, the gap or groove 116 may filled with an adhesive, gel, polymer or liquid having an index of refraction that substantially matches that of the lens. Still alternatively, the interior facing edges of the non-rectilinearly shaped OIC chip 110 (in the groove 116) can be coated with an antireflection film and remain exposed to air.

As the temperature of the structure changes, the stabilizing brace 112 changes length at a different rate than the substrate of the non-rectilinearly shaped OIC chip 110, due to differences in the coefficients of thermal expansion. This causes a change in the angle between the two regions of the non-rectilinearly shaped OIC chip (on either side of the groove 116), in particular between two regions of the lens traversed by the groove 116, and deflection of part of the lens and the input (our output) waveguide to move the waveguide relative to the focus point of the light, thus shifting which wavelengths are focused into the waveguide grating, and thus causes a shift in the center wavelength of the device. The stabilizing brace and base/riser material size and shape are chosen such that the center wavelength shift caused by the thermal expansion/contraction of the stabilizing brace exactly balances the center wavelength shift in the non-rectilinearly shaped OIC chip due to change in temperature. As a result, the non-rectilinearly shaped OIC chip's center wavelength is independent of temperature. The amount of pre-bias put on the stabilizing brace also can be tuned to tune in the correct center wavelength for the non-rectilinearly shaped OIC.

Figure 13:
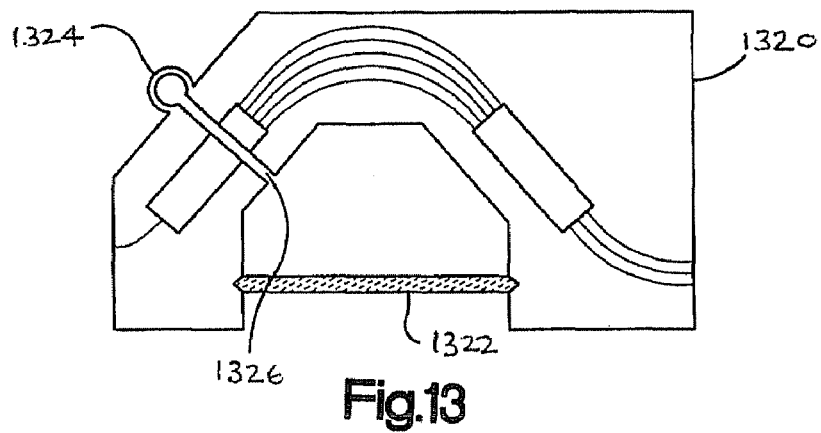
FIG. 13 is a schematic top plan view of another non-rectilinearly shaped OIC with a stabilizing brace in accordance with one aspect of the subject invention.

Referring to FIG. 13, another embodiment of a non-rectilinearly shaped OIC chip 120 is shown having a substrate, an input waveguide, a first lens, a second lens, a waveguide grating between the two lenses containing a plurality of waveguides, and output waveguides. A stabilizing brace 122 connects two regions of the chip, divided by a groove 126. The non-rectilinearly shaped OIC chip 120 contains a hinge 124.

The gap or groove 126 is formed in the non-rectilinearly shaped OIC chip 120 traversing an optical component, such as one or more of the lenses. The groove 126 goes all the way through the non-rectilinearly shaped OIC chip 120 vertically. The groove 126 is formed in any suitable manner including using a dicing saw, water jet cutting, chemical etching, laser-wafer-cutter, wire-saw, EDM, and the like. Although not shown, the groove 126 may traverse the waveguide grating instead of the lens, and the hinge 124 would be positioned visually above the waveguide grating.

Within the gap or groove 126, a waveplate (not shown), such as a half waveplate, may be optionally formed, particularly when the groove traverses the waveguide grating. Additionally or alternatively, the gap or groove 126 may filled with an adhesive, gel, polymer or liquid having an index of refraction that substantially matches that of the lens. Still alternatively, the interior facing edges of the non-rectilinearly shaped OIC chip 120 (in the groove 126) can be coated with an antireflection film and remain exposed to air.

As the temperature of the structure changes, the stabilizing brace 122 changes length at a different rate than the substrate of the non-rectilinearly shaped OIC chip 120, due to differences in the coefficients of thermal expansion. This causes a change in the angle between the two regions of the non-rectilinearly shaped OIC chip (on either side of the groove 126), in particular between two regions of the lens traversed by the groove 126, and deflection of part of the lens and the input (our output) waveguide to move the waveguide relative to the focus point of the light, thus shifting which wavelengths are focused into the waveguide grating, and thus causes a shift in the center wavelength of the device. The stabilizing brace and base/riser material size and shape are chosen such that the center wavelength shift caused by the thermal expansion/contraction of the stabilizing brace exactly balances the center wavelength shift in the OIC due to change in temperature. As a result, the non-rectilinearly shaped OIC chip's center wavelength is independent of temperature. The amount of pre-bias put on the stabilizing brace also can be tuned to tune in the correct center wavelength for the non-rectilinearly shaped OIC.

Figure 14:
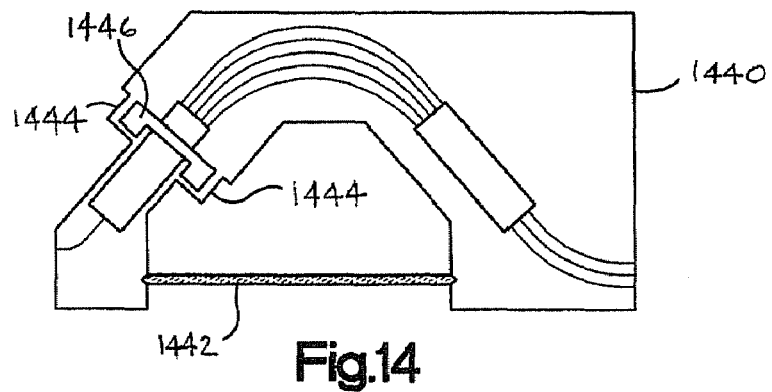
FIG. 14 is a schematic top plan view of still yet another non-rectilinearly shaped OIC with a stabilizing brace in accordance with one aspect of the subject invention.

Referring to FIG. 14, yet another embodiment of a non-rectilinearly shaped OIC chip 140 is shown having a substrate, an input waveguide, a first lens, a second lens, a waveguide grating between the two lenses containing a plurality of waveguides, and output waveguides. A stabilizing brace 142 connects two regions of the chip, divided by a groove 146. The non-rectilinearly shaped OIC chip 140 contains two hinges 144.

The gap or groove 146 is formed in the non-rectilinearly shaped OIC chip 140 traversing an optical component, such as one or more of the lenses. The groove 146 goes all the way through the non-rectilinearly shaped OIC chip 140 vertically. The groove 146 is formed in any suitable manner including using a dicing saw, water jet cutting, chemical etching, laser-wafer-cutter, wire-saw, EDM, and the like. Although not shown, the groove 146 may traverse the waveguide grating instead of the lens, and the hinges 144 would be positioned visually above and below the waveguide grating.

Within the gap or groove 146, a waveplate (not shown), such as a half waveplate, may be optionally formed, particularly when the groove traverses the waveguide grating. Additionally or alternatively, the gap or groove 136 may filled with an adhesive, gel, polymer or liquid having an index of refraction that substantially matches that of the lens. Still alternatively, the interior facing edges of the non-rectilinearly shaped OIC chip 140 (in the groove 146) can be coated with an antireflection film and remain exposed to air.

As the temperature of the structure changes, the stabilizing brace 142 changes length at a different rate than the substrate of the non-rectilinearly shaped OIC chip 140, due to differences in the coefficients of thermal expansion. This causes a change in the angle between the two regions of the non-rectilinearly shaped OIC chip (on either side of the groove 146), in particular between two regions of the lens traversed by the groove 146, and deflection of part of the lens and the input (our output) waveguide to move the waveguide relative to the focus point of the light, thus shifting which wavelengths are focused into the waveguide grating, and thus causes a shift in the center wavelength of the device. The stabilizing brace and base/riser material size and shape are chosen such that the center wavelength shift caused by the thermal expansion/contraction of the stabilizing brace exactly balances the center wavelength shift in the non-rectilinearly shaped OIC chip due to change in temperature. As a result, the non-rectilinearly shaped OIC chip's center wavelength is independent of temperature. The amount of pre-bias put on the stabilizing brace also can be tuned to tune in the correct center wavelength for the non-rectilinearly shaped OIC.

Further description of athermal non-rectilinearly shaped OICs exists in U.S. Pat. Nos. 6,603,892 and 6,738,545, which are hereby incorporated by reference.

The metric used to quantify the sensitivity of an optical circuit is referred to as the center wavelength shift over temperature. For example, a typical silica based AWG (on a rectangular substrate) without any temperature control has a center wavelength sensitivity of 11 picometers per degree C. In one embodiment, the non-rectilinearly shaped OICs of the invention have a center wavelength sensitivity of about 10 picometers or less per degree C. over the temperature range of −5° C. to 65° C. In another embodiment, the non-rectilinearly shaped OICs of the invention have a center wavelength sensitivity of about 7.5 picometers or less per degree C. over the temperature range of −5° C. to 65° C. In yet another embodiment, the non-rectilinearly shaped OICs of the invention have a center wavelength sensitivity of about 5 picometers or less per degree C. over the temperature range of −5° C. to 65° C.

The optical devices containing the non-rectilinearly shaped OICs supported by a stabilizing brace and a riser with relief structure exhibit at least one of a high degree of center wavelength control, high package yields, and high wafer yields of non-rectilinearly shaped OICs. The invention thus also describes methods of improving control over center wavelength shift in non-rectilinearly shaped OICs, methods of improving package yields, and methods of improving wafer yields of stable, non-rectilinearly shaped OICs.

The optical devices containing the non-rectilinearly shaped OICs supported by a stabilizing brace and a riser with relief structure may be passive optical devices or active optical devices.

With respect to any figure or numerical range for a given characteristic, a figure or a parameter from one range may be combined with another figure or a parameter from a different range for the same characteristic to generate a numerical range.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An optical device comprising:
a base comprising a riser, the riser comprising a substantially flat portion and a relief structure;
a non-rectilinearly shaped optical integrated circuit over the substantially flat portion of the riser;
a stabilizing brace connected to a first portion of the non-rectilinearly shaped optical integrated circuit and a second portion of the of the non-rectilinearly shaped optical integrated circuit through free space; and
an apparatus for controlling temperature of at least one of the riser, the non-rectilinearly shaped optical integrated circuit, and the stabilizing brace;
the substantially flat portion of the riser in thermal contact with the non-rectilinearly shaped optical integrated circuit and the relief structure of the riser in thermal contact with the stabilizing brace.

2. The optical device of claim 1, the non-rectilinearly shaped optical integrated circuit having a center wavelength sensitivity of about 10 picometers or less per degree C. over the temperature range of −5° C. to 65° C.

3. The optical device of claim 1, the stabilizing brace and a non-rectilinearly shaped optical integrated circuit substrate are made of materials that have coefficients of thermal expansion within about 25% of each other.

4. The optical device of claim 1, the optical integrated circuit comprises a planar lightwave circuit.

5. The optical device of claim 1, the stabilizing brace comprising a thermal actuator.

6. The optical device of claim 1 further comprising a heater in thermal contact with the riser.

7. The optical device of claim 1, the non-rectilinearly shaped optical integrated circuit comprising an arrayed waveguide grating.

8. The optical device of claim 1, the non-rectilinearly shaped optical integrated circuit having curvilinear and straight edges.

9. An optical device comprising:
a base comprising a riser, the riser comprising a substantially flat portion and a relief structure;
a non-rectilinearly shaped optical integrated circuit over the substantially flat portion of the riser;
a stabilizing brace connected to a first portion of the non-rectilinearly shaped optical integrated circuit and a second portion of the of the non-rectilinearly shaped optical integrated circuit through free space; and
an apparatus for controlling temperature of at least one of the riser, the non-rectilinearly shaped optical integrated circuit, and the stabilizing brace,
the substantially flat portion of the riser in thermal contact with the non-rectilinearly shaped optical integrated circuit and the relief structure of the riser in thermal contact with the stabilizing brace, the non-rectilinearly shaped optical integrated circuit having a center wavelength sensitivity of about 7.5 picometers or less per degree C. over the temperature range of −5° C. to 65° C.

10. The optical device of claim 9, the stabilizing brace and a non-rectilinearly shaped optical integrated circuit substrate are made of materials that have coefficients of thermal expansion within about 25% of each other.

11. The optical device of claim 9, the optical integrated circuit comprises a planar lightwave circuit.

12. The optical device of claim 9, the stabilizing brace comprising a thermal actuator.

13. The optical device of claim 9 further comprising a heater in thermal contact with the riser.

14. The optical device of claim 9, the non-rectilinearly shaped optical integrated circuit comprising an arrayed waveguide grating.

15. The optical device of claim 9, the non-rectilinearly shaped optical integrated circuit having curvilinear and straight edges.

16. An optical device comprising:
a base comprising a riser, the riser comprising a substantially flat portion and a relief structure;
a non-rectilinearly shaped optical integrated circuit over the substantially flat portion of the riser;
a stabilizing brace connected to a first portion of the non-rectilinearly shaped optical integrated circuit and a second portion of the of the non-rectilinearly shaped optical integrated circuit through free space; and
an apparatus for controlling temperature of at least one of the riser, the non-rectilinearly shaped optical integrated circuit, and the stabilizing brace,
the substantially flat portion of the riser in thermal contact with the non-rectilinearly shaped optical integrated circuit and the relief structure of the riser in thermal contact with the stabilizing brace, the stabilizing brace and a non-rectilinearly shaped optical integrated circuit substrate are made of materials that have coefficients of thermal expansion within about 10% of each other.

17. The optical device of claim 16, the non-rectilinearly shaped optical integrated circuit having a center wavelength sensitivity of about 5 picometers or less per degree C. over the temperature range of −5° C. to 65° C.

18. The optical device of claim 16, the non-rectilinearly shaped optical integrated circuit comprising an arrayed waveguide grating.

19. The optical device of claim 16, the stabilizing brace comprising a thermal actuator.

20. The optical device of claim 16 further comprising a heater in thermal contact with the riser.

* * * * *

UNITED STATES PATENT AND TRADEMARK OFFICE
CERTIFICATE OF CORRECTION

PATENT NO. : 7,447,394 B2 Page 1 of 1
APPLICATION NO. : 11/753074
DATED : November 4, 2008
INVENTOR(S) : Ho et al.

It is certified that error appears in the above-identified patent and that said Letters Patent is hereby corrected as shown below:

Title page, item (73) Assignee: Neophotonics Corporation, San Jose, CA (US)

It should read:

(73) Assignee: NeoPhotonics Corporation, San Jose, CA (US)

Signed and Sealed this

Fifteenth Day of June, 2010

David J. Kappos
*Director of the United States Patent and Trademark Office*